United States Patent [19]
Harada

[11] Patent Number: 5,404,193
[45] Date of Patent: Apr. 4, 1995

[54] DISPLAY DEVICE SUPERIMPOSED IN VIEWFINDER WITH ADJUSTABLE BRIGHTNESS

[75] Inventor: Yoshihito Harada, Yokohama, Japan

[73] Assignee: Canon Kabushiki Kaisha, Tokyo, Japan

[21] Appl. No.: 20,454

[22] Filed: Feb. 22, 1993

Related U.S. Application Data

[63] Continuation of Ser. No. 562,928, Aug. 6, 1990, abandoned.

[30] Foreign Application Priority Data

| Aug. 4, 1989 | [JP] | Japan | 1-203058 |
| Aug. 4, 1989 | [JP] | Japan | 1-203060 |
| Aug. 4, 1990 | [JP] | Japan | 1-203061 |

[51] Int. Cl.⁶ .................. G03B 13/00; G03B 17/20
[52] U.S. Cl. .................. 354/409; 354/471
[58] Field of Search .............. 354/471, 472, 473, 474, 354/475, 289.1, 222, 223, 219, 409, 289.12

[56] References Cited

U.S. PATENT DOCUMENTS

| 3,955,892 | 5/1976 | Numata et al. | 354/219 |
| 4,112,440 | 9/1978 | Kanemaru | 354/471 |
| 4,436,397 | 3/1984 | Kobayashi | 354/465 |
| 4,483,602 | 11/1984 | Aoki et al. | 354/402 |
| 4,597,659 | 7/1986 | Suda et al. | 354/409 |
| 4,692,014 | 9/1987 | Kiuchi | 354/471 |
| 4,746,947 | 5/1988 | Nakai | 354/400 |
| 4,792,820 | 12/1988 | Norita et al. | 354/409 |
| 4,949,116 | 8/1990 | Karasaki et al. | 354/408 |

FOREIGN PATENT DOCUMENTS

| 0224336 | 6/1987 | European Pat. Off. |
| 57-177134 | 4/1981 | Japan |
| 63-174032 | 7/1988 | Japan |

Primary Examiner—W. B. Perkey
Attorney, Agent, or Firm—Fitzpatrick, Cella, Harper & Scinto

[57] ABSTRACT

A superimposed display device that superimposes indicators upon an image seen in the viewfinder includes a display that displays multiple displays in fields superimposed upon the image of the viewfinder, a detector that detects the brightness intensity of the fields, and a controller that controls the brightness of the displays and the brightness intensity information concerning a field obtained by the detector. The superimposed indicators are displayed at several locations and by application of both a phased constant drive and brightness modulation, thereby enabling superimposed indicators to be displayed with a wide dynamic range capable of keeping track of an object possessing a brightness pattern.

27 Claims, 9 Drawing Sheets

DISPLAY DEVICE SUPERIMPOSED IN VIEWFINDER WITH ADJUSTABLE BRIGHTNESS

This application is a continuation of application Ser. No. 07/562,928, filed Aug. 6, 1990, now abandoned.

BACKGROUND OF THE INVENTION

1. Field of the Invention

The present invention generally relates to a display device which is overlaid on the picture in the viewfinder of the camera.

2. Related Background Art

In past conventional models, since all information such as the exposure and lens opening was indicated outside the picture frame in the viewfinder, a rough parallelism between the brightness of the information and that of the object to be photographed was enough to ensure basic visual comfort. One example of this is U.S. Pat. No. 4,692,014 in which the brightness level of the indication outside the frame is controlled in accordance with the average photometric data obtained within the frame. Another way to control the brightness level of the indication outside the frame which is disclosed in Japanese Patent Application No. 62-6344 is based on photometric information obtained by measuring the brightness of the frame's periphery and by measuring the brightness level of the frame after dividing it into several blocks.

SUMMARY OF THE INVENTION

When an indication is "superimposed" on the object in the frame it is sometimes vague because of the object's brightness. On the other hand, when the indication is too bright against the object, then it becomes uncomfortable to look at it.

One aspect of the present invention is the possibility to choose whether or not to have a superimposed indication within the frame and if the indication is chosen, the brightness in compliance with the numeric information will track the brightness of the object to ensure utmost visual comfort. Another aspect of this invention is the automatic variation of the brightness of the information in response to that of the object. Since this is made possible through a phased combination of a constant-current drive and a brightness modulation drive, photometric error under low brightness due to delayed response of the photometric sensor is prevented.

DETAILED DESCRIPTION OF PREFERRED EMBODIMENT

Figures 1A, 1B:
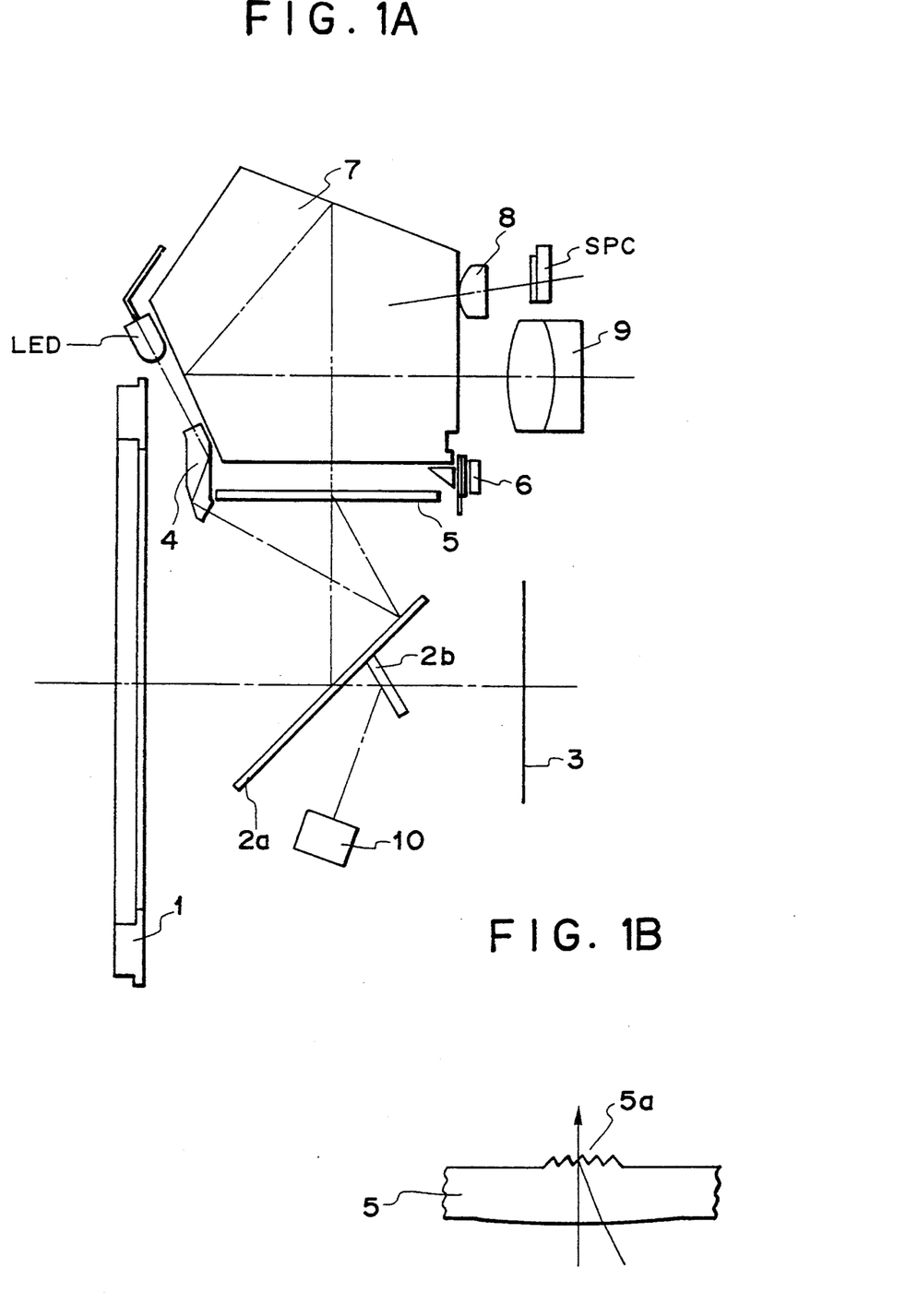
FIGS. 1A and 1B show explanatory drawings of a camera according to an embodiment of the present invention.

The explanatory FIG. 1A shows a camera seen from the side. The reference numeral 1 denotes a mount, 2a a main mirror, 2b a sub-mirror, 3 a film surface, 4 a LED flood light prism, 5 a focusing frame, 6 a device for displaying information outside the frame reticle in the viewfinder, 7 a pentaprism, 8 a photometric lens for the SPC photometric sensor, and 9 an eyepiece of the viewfinder, and 10 a sensor for autofocusing.

The light passing through the objective (not shown in the figure) is deflected 90° by the main mirror 2a and reflected by the pentaprism 7 and reaches the eye after passing through the eyepiece 9. The light reflected by the sub-mirror 2b is directed to the autofocusing sensor 10. The light reaching the matter field of the focusing frame 5 is projected onto the SPC photometric sensor via the photometric lens. The LED light passes through the flood light prism 4 and is reflected by a main-mirror. The light is deflected vertically by a microprism array 5a on the indicator portion of the focusing frame 5 and travels through the pentaprism 7 to reach the eye via the eyepiece. By selectively distributing this microprism array 5a of the focusing frame 5 it is possible to use the LED light source to obtain bright LED indications like the so-called superimposed indicators d1, d2 and d3 shown in FIG. 2.

Superimposed indicators are superimposed on the object inside the frame reticle of the viewfinder. Accordingly, an appropriate brightness should be found since they must be indicated with a brightness that is not outshone by the brightness of the subject. Conversely, if they are too bright, they may hamper observation of the object.

Hitherto, indications, like the information generated by the display device 6, have been shown outside the frame reticle device and could not get lost in the viewfinder image. Selecting a reasonable brightness once and for all was enough. However, to track the brightness of the object when superimposing, it is necessary to change the brightness of the indicators to follow the camera's 20-step dynamic photometric range.

Figure 2:
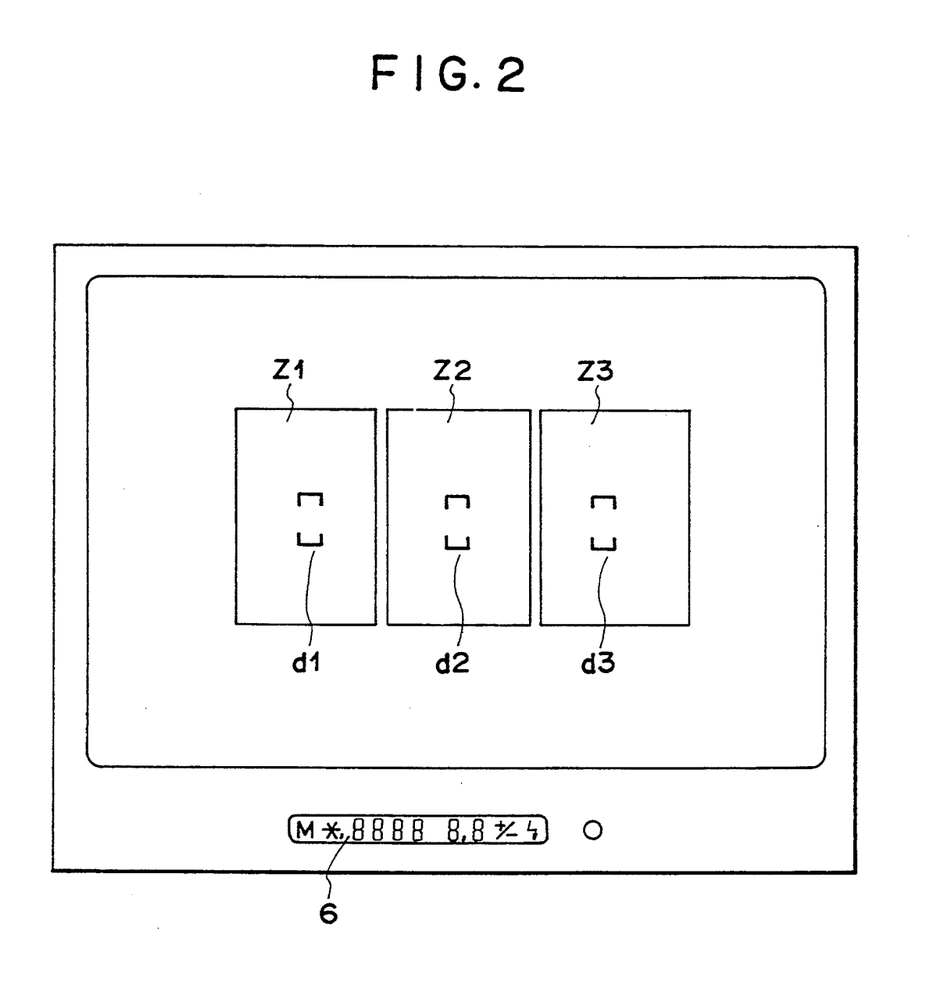
FIG. 2 shows an example of indication in the viewfinder.

The three fields Z1 to Z3, shown in FIG. 2, indicate the photometric fields of the SPC photometric sensor. These fields, including the superimposed indicators d1 through d3, can be distributed as necessary.

Figure 3:
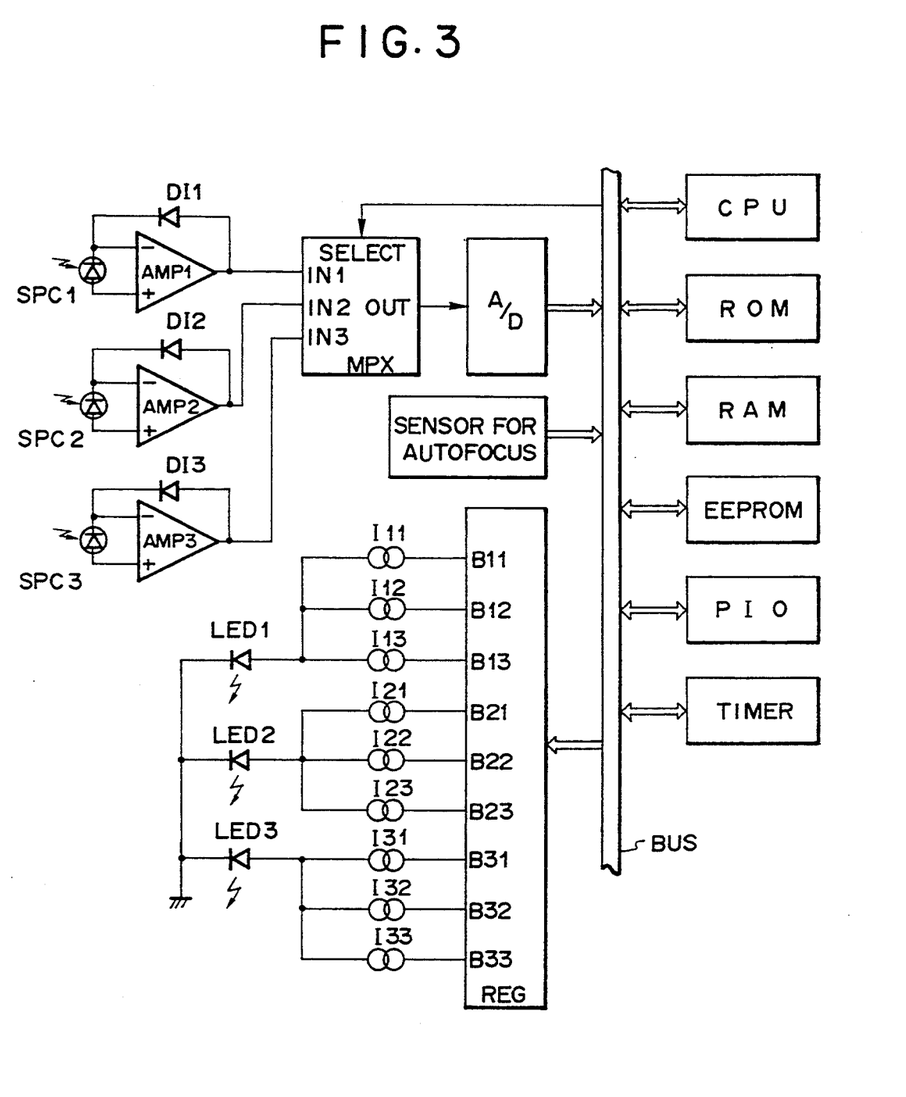
FIG. 3 shows a schematic circuit diagram of the camera according to the present embodiment.

FIG. 3 shows the circuit that actualizes the present embodiment.

The photometric sensors SPC1 to SPC3 correspond with the fields Z1 to Z3. Each sensor is connected with photometric amplifiers AMP1 to AMP3 and condenser diodes DI1 to DI3 to thereby transform the light into electric impulses and the logarithmical compressed voltage is transmitted to the inputs IN1 to IN3 of the MPX multiplexers.

One of the inputs IN1 to IN3, selected as the SELECT terminal signal, is sent via OUT to the A/D converter and read-out by the CPU central processing unit (hereinafter referred to only as CPU). The following elements are connected in the internal BUS of the microcomputer; ROM where the programs are stored in; RAM contains the random access memory concerning the work area for arithmetic functions; EEPROM is a non-volatile storage for storing non-volatile memory like data concerning adjustments, PIO is general-use input and output port; TIMER, which is a timer/counter. The CPU executors according to the ROM program and has access to the ROM, RAM, EEPROM, PIO, TIMER and A/D converter. The LEDs corresponding to the superimpose indicators d1 to d3 (FIG. 2) are called LED1 to LED3 and each has three constant current sources $I_{i1}$ to $I_{i3}$ (I corresponds to LED1 to LED3). These constant current sources are constructed in a way so that when the register REG's output Bij are HIGH they are in 'enable' state. When LOW, they are in 'disable' state.

Figure 4:
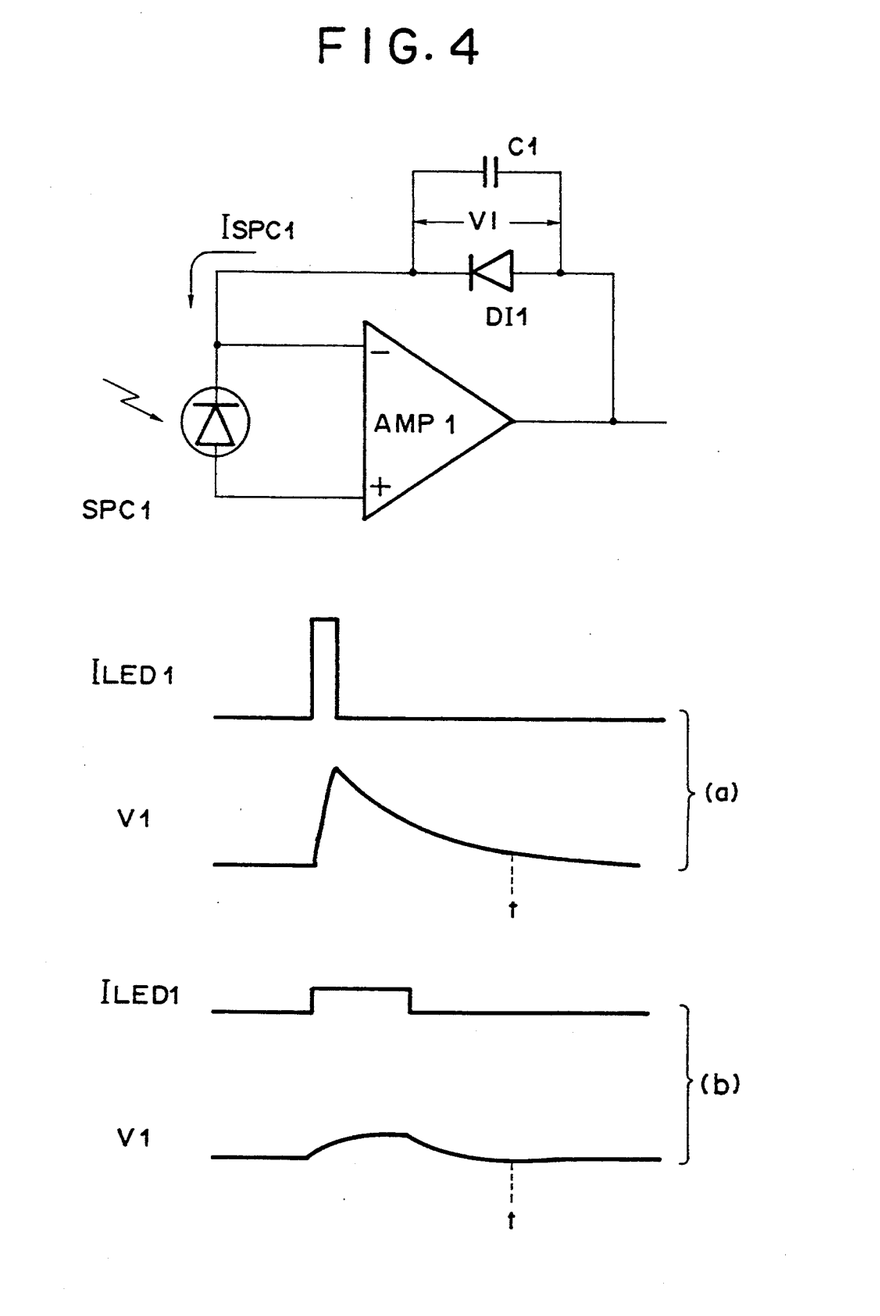
FIG. 4 shows a photometric circuit and drive according to the present embodiment.

The photometric circuit will be described with reference to FIG. 4.

The condenser capacitor diode DI1 contains a condenser C1. As explained above, the brightness of the superimposed indicators must be adjusted to track the brightness of the subject in the viewfinder in order to obtain an image easily observed with the eye. The brightness of the object processed by the camera is divided into a maximum of 20 different levels. When brightness modulation is used to maintain such a wide dynamic range, problems like that indicated in (a) may appear.

In modulation, a large current should be used to allow observation under high brightness conditions. During low brightness conditions, the LED should light for a short time and duty should be shortened to thereby suppress the brightness observed by the human eye. The output of the SPC1 photometric sensor in the form of the photo-electric current ISPC1 is greatly increased when the LED lights. Accordingly, the electric charge is sufficient to charge the capacitor C1 and the current is quickly returned to a balanced state. However, particularly in the case of subjects with low brightness, even when the LED is on, a balanced state cannot be obtained at the time 't' because the capacitor C1 is discharged until a voltage level corresponds to the photo-electric current, and the photo-electric current depends upon the brightness of the subject.

(b) shows the drive when a low electric current and long lighting time is applied and (a), that will appear to be the same as (b) when observed by the human eye, shows the drive when a high electric current and short lighting time is applied. In the case of (b), the photoelectric current ISPC1 does not increase as much according to the lighting of the LED and time is required to charge the capacitor C1. Since the potential difference of the voltage V1 between a lighted state and un-lighted state is small, it is possible for the current to reach a balanced state at the 't' time instant.

Accordingly, during low brightness conditions, it is practical to control the LED drive current in order to maintain a LED brightness that keeps track of the brightness of the object. However, it is difficult to maintain a wide dynamic range only by utilizing electric current. On the other hand it is also difficult to obtain a 20-step brightness modulation by brightness modulation alone.

When superimposing, the photometric sensor measures the object. Since the superimposed indicators appear within the sensitivity distribution, the light intensity is increased by the presence of the indicators. Accordingly, if photometry is carried out while the indicators are displayed, the measured output will consist of wrong data. A time sharing process is therefore indispensable.

Figure 6:
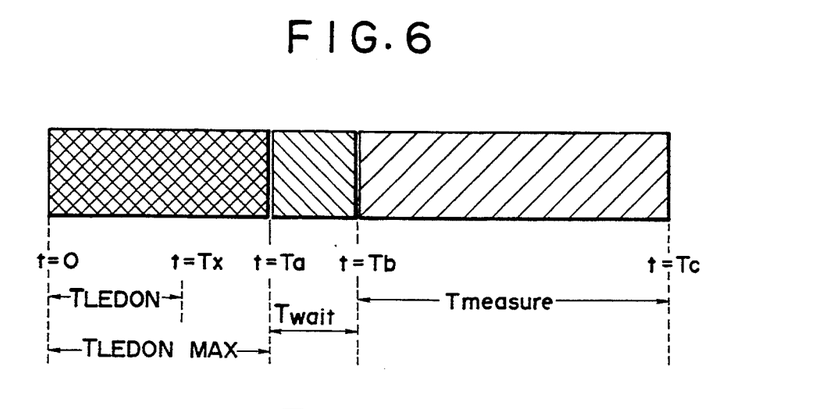
FIG. 6 shows a time sharing relationship between indication and photometry.

FIG. 6 shows a relationship between photometry and a time sharing of superimposed indication, where $t=0-T_a$ represents the maximum display time in the indicator section, and $t=T_b-T_C$ denotes a photometry section. The period between $t=0$ and $t=Ta$ is a time TLEDON in which the LED can be illuminated. The period between $t=Ta$ and $t=Tb$ is the waiting time TWAIT after the LED is turned off before photometry is performed. The period between $t=Tb$ and $t=Tc$ is a period during which the photometry is performed. As shown in FIG. 6, the LED can be illuminated for a maximum time TLEDON MAX until $t=Ta$. Since the photometry is base upon man-made flickering, it is desirable for the photometry to be carried out within a range of approximately 8.3 ms-10.0 ms in view of power frequency of 50 Hz or 60 Hz. However, to prevent the superimposed indicators from flickering, the cycle $T_c$ should be at a frequency where the human eye cannot perceive the flicker, that is below 20 ms and above 50 Hz. Accordingly, TLEDON-MAX=$T_a$ should be within 10 ms(=20 ms−10 ms). Since the mechanism in which a tracked wide dynamic-range brightness control is applied, as stated before, to the object brightness, involving the FIG. 4(b) driving, $T_{wait}$ is necessitated, with maximum value of $T_{wait}$ added to TLEDON-MAX resulting in 10 ms (20 ms−10 ms). In other words, as shown in FIG. 6, while the superimposing is suspended, the photometry is performed for a T measure span during which a man-made light source flickering is inhibited And then the superimposed indicators is lit for a $T_x$ period at a brightness that corresponds to the photometric output for the object to be displayed. And before the next measurement, there will be a $T_{wait}$ span of waiting time that allows the voltage at the photometric circuit to settle down to a level that corresponds to the voltage for the brightness of the object. An ample wait-time may be secured in addition to a $T_{wait}$ span by having this display luminance modulation successive to the previous sequence, eliminating any intervening gap.

Figure 5:
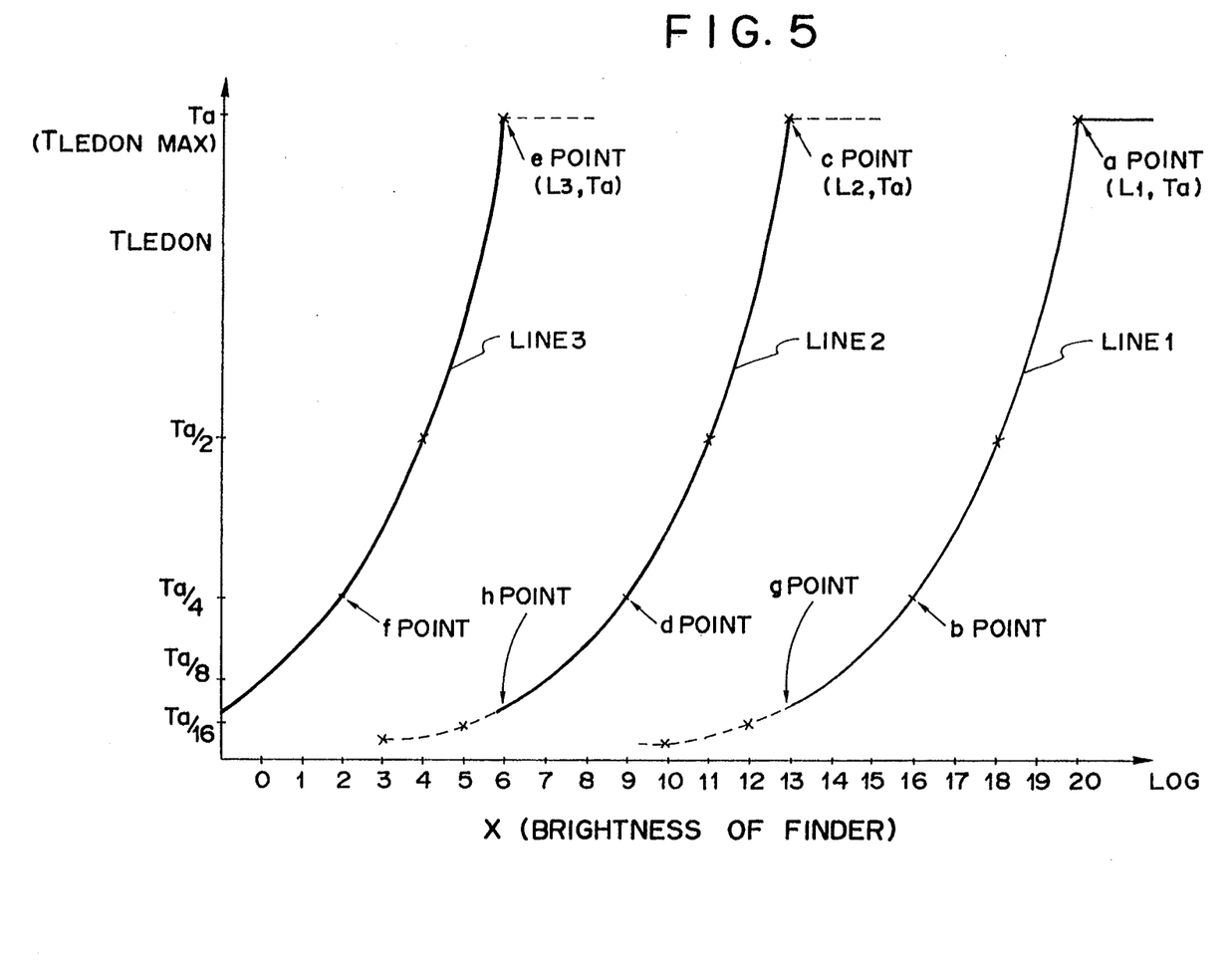
FIG. 5 shows a drive current and drive time for indication.

FIG. 5 is a graphic presentation of the relationships among the superimposed indicators corresponding to the object brightness, the drive current and the drive time, with the horizontal bar showing by logarithm the object brightnesses on the focusing frame 5, and the vertical bar showing the LED-lit time $T_x$, and the drive current of the superimposed indicators at a phase shown at FIG. 6. With reference to FIG. 5, a strong drive current is applied when the object is very bright like line one, and the drive current should be decreased as the object brightness goes down. With regard to the luminance modulation, as the brightness darkens below $T_x=T_a$, the drive time must be expotentially shortened.

Figure 7:
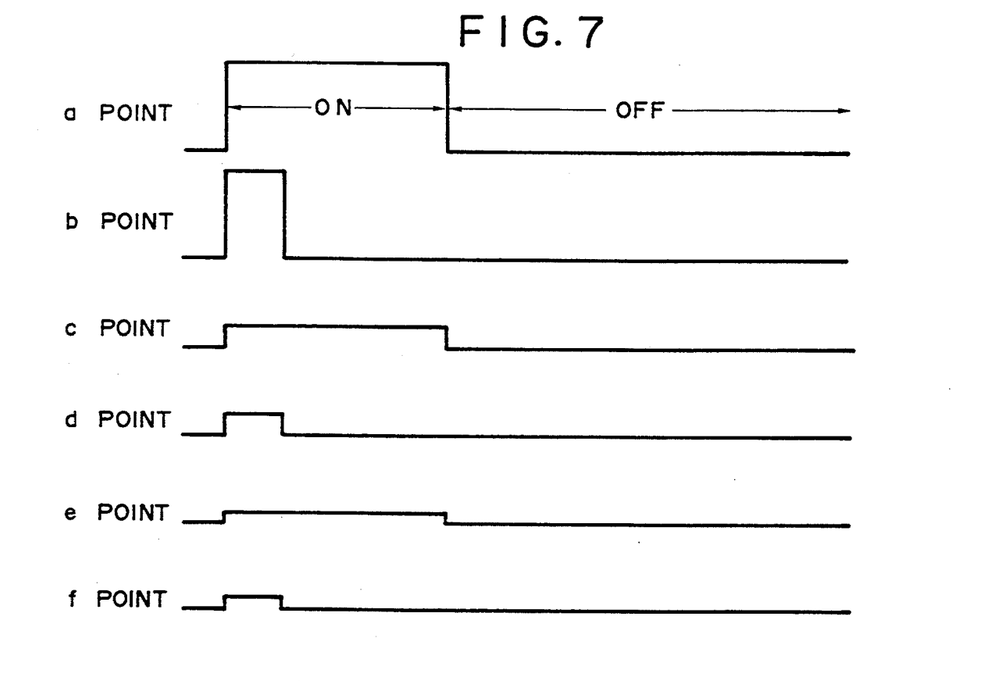
FIG. 7 shows a relationship between current and drive time pertaining to the indication.

FIG. 7 shows the currents and the drive-time lengths, $T_x$, corresponding respectively to point a through point f, with the vertical line length representing the current and the horizontal "on" span $T_x$. FIG. 7 shows that the superimposed indicators time should be halved as the object brightness halves or darkens one-step. It should be noted, however, that $T_x$ does not correspond to $T_a/2$ at x=20, while FIG. 5 shows $T_a$(drive-time lengths). This is caused by the nature of the human eye perceiving the object to be at one brightness level.

For example, even if the ratio of line one to line two may be one to eight, the drive time ratio of line one to line two at which the human eye perceives the object to be at the same brightness, the drive time ratio still does not agree to one eights, resulting from the unlinear relationship between the current and the beam quantity. With $\gamma_j(j=1-3)$ as the modulation factor for the current line 1-line 3. Therefore, $$T_x = T_a \times \frac{1}{2\gamma_j(L_j - x)} \qquad (j = 1-3)$$

This equation represents assured proper operation of the superimposed indicators for the following reasons: Here, $\gamma_j$ is recommendably 0.4–0.8, depending on LED. With regard to $L_j$ (j=1–3) and points a c and e as the object brightness goes down below point a, it changes as shown by points b and g along the line 1 and at point c, it trips over to the line 2 (see FIG. 5). Points g and c refer to where the human eye perceives same brightness. In this manner, simple application of modulation factors like $L_1$, $L_2$, $L_3$ and $\gamma_1$, $\gamma_2$, $\gamma_3$ to the equation shown above allows a superimposing operation that is free of undesirable influences from such as the human eye characteristics, LED characteristics, constant current fluctuations, dispersion in LED beam projection, etc. Furthermore, combined use of duty-drive and gradual-constant-current drive provides for superimposed coverage over a wide and dynamic range.

Figures 8, 8A:
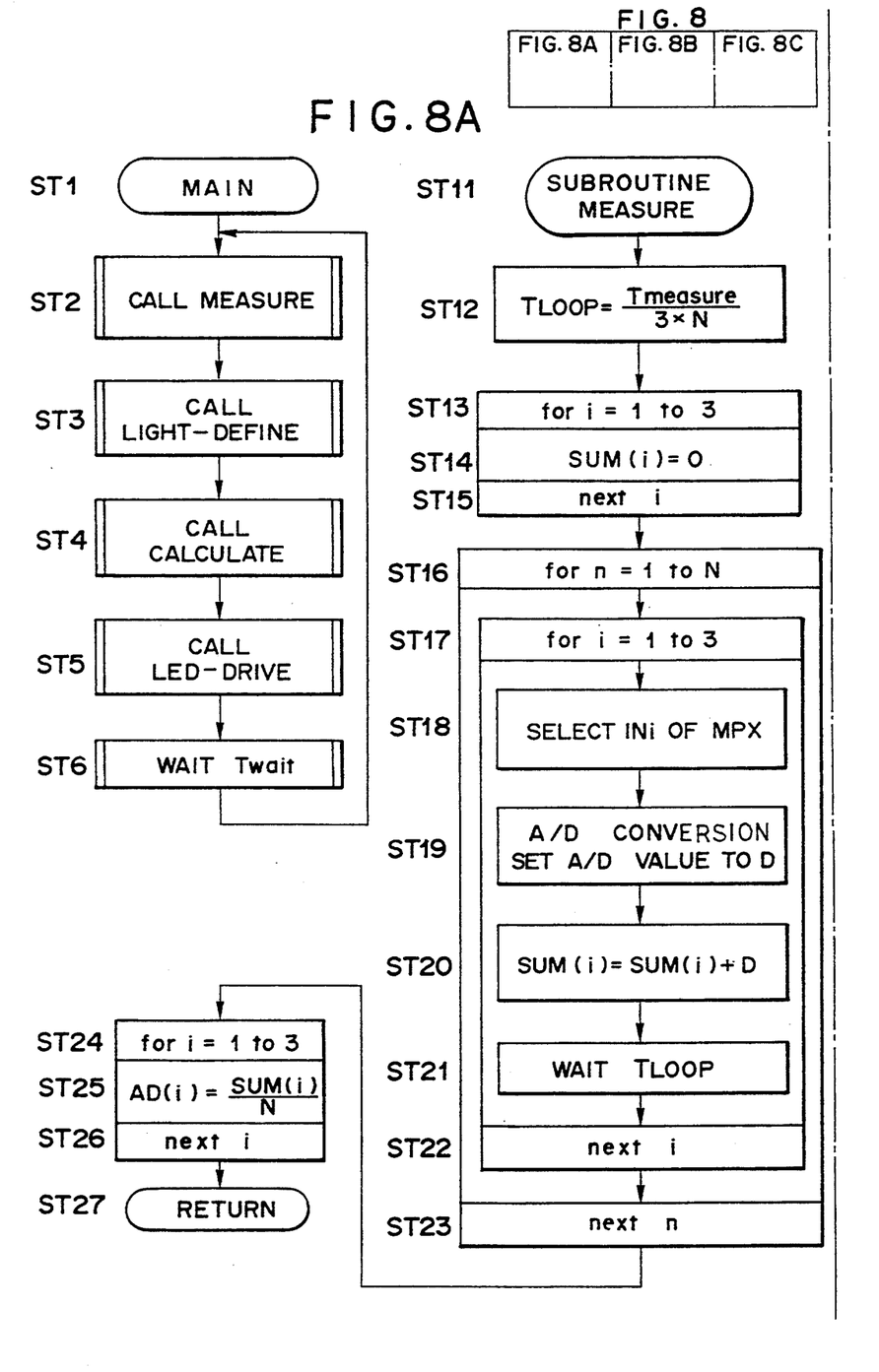
FIG. 8 is a block diagram of FIGS. 8A, 8B, and 8C showing a flow chart.
Figure 8B:
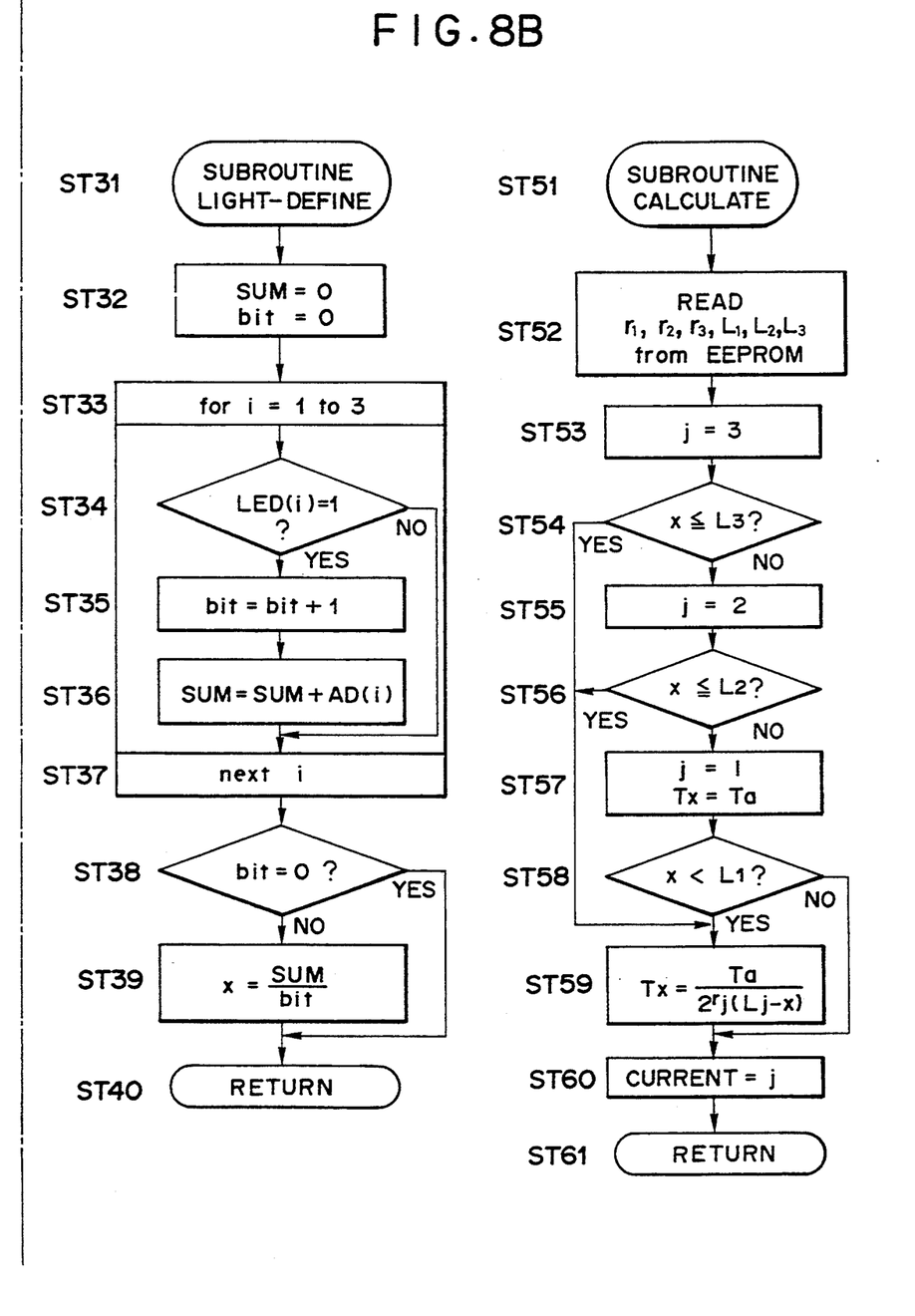
Figure 8C:
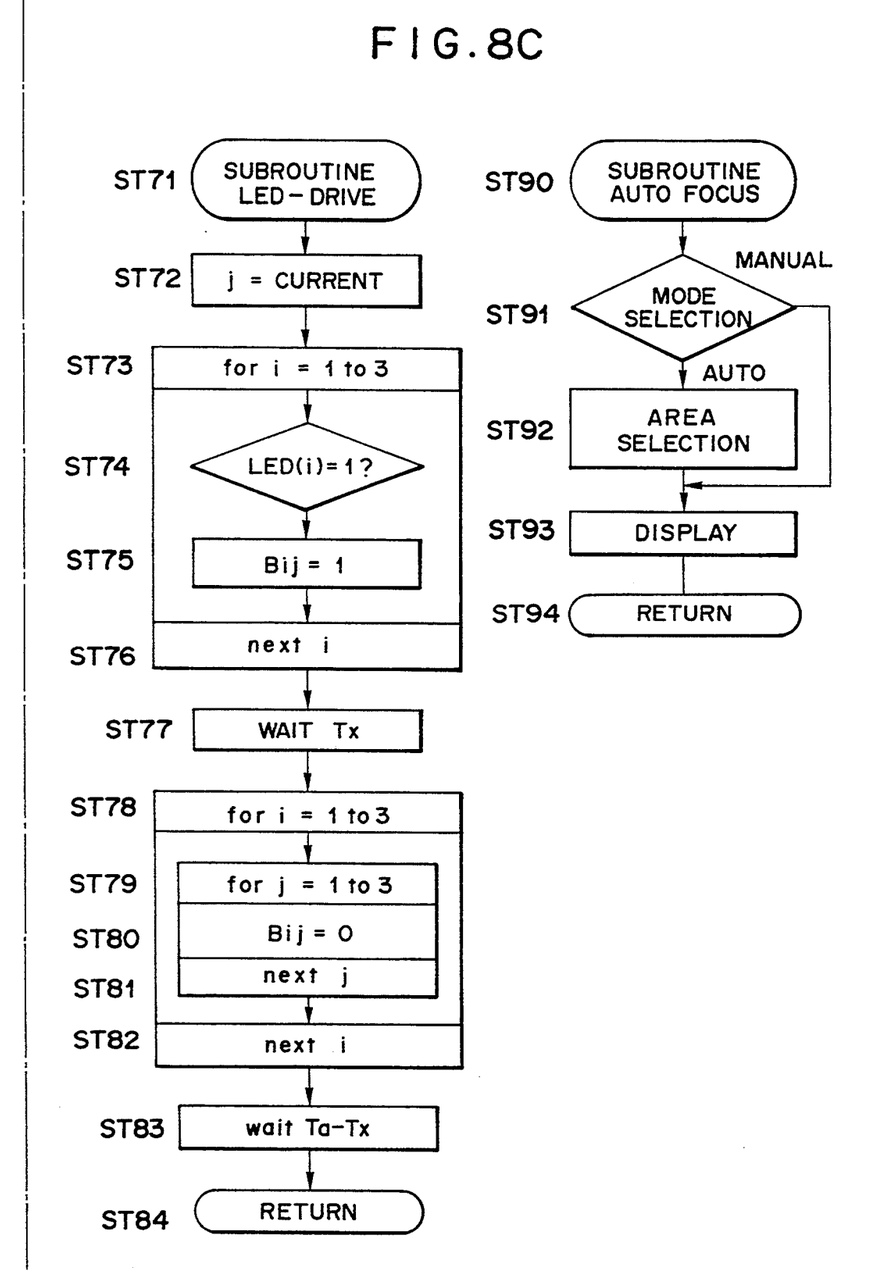

FIG. 8 represents the following:

STO1: The photometry, computation and display are performed as the main routine operation. In addition, timed insertion is also available when it carries timewise compatibility as well as simultaneous operation of another program.

This main routine operation is based on an arrangement LED (i) i=1–3 with the input coming in via port PIO; and also on a setting in which, with regard to LED 1–3, 1 for on and 0 for off as per the input from another program (auto-focus as explained later on); and also on the modulation factors ($\gamma_j$, $L_j$, j=1–3) are written in EEPROM at the factory.

ST02: Calling of the photometric routine. N represents the input factor, that is, the number of the photometric sampling; and AD(i),1–3 stands for the object brightness within the sensitivities of the three sensors. In the photometric routine, the measured value AD(i) of each sensor is taken from the mean value of several samplings within the $T_{measure}$ time span. At this time, the superimposed indicator is output.

ST03: A brightness decision routine is called. As stated above, a superimposed indicators should be neither too bright nor too dark since it will be overlaid on the object to be photographed in the frame of the view finder, Therefore, the display and photometric area should be placed proportionately as shown in FIG. 2. When only LED1 flashes on, the brightness of it must necessarily be determined by the photometric output power of area Z1. It will be the same for LED2 and for LED3. However, when more than two LEDs are lit up simultaneously, it will be difficult to access control because of the differences in contrast between indicators resulting from the brightness of each corresponding object. At the same time, when one sees into the viewfinder, he or she may feel uncomfortable, because of the difference in brightness of the LEDs. When only one of the superimposing LEDs is operating, the brightness of the indicator to be lit up as against that of the object photographed will be the same to everyone and no one will be able to tell the difference at this level. However, it would be easy to see the difference between two levels of brightness when there are more than two LEDs in operation. In this case, it may be unpleasant to notice every level of difference in brightness. This problem will be solved, in the Light DEFINE Routine mode, as shown in step 3, by taking the average photometric output power of each corresponding zones, and by driving both displays with the same brightness or substantially the same brightness. The input variables of this Routine are LED (i)=1 to 3 which are the flashing LEDs, and AD (i) i=1 to 3 which is the photometric value of the three photometric sensors. The output variables, 'x' determine the brightness of the flashing LEDs on the focus frame 5.

ST04: The brightness information 'x' on the focusing frame is the input power, and the electrical current plus the duty drive time $T_x$ are the output power. The method shown in FIG. 5 is algorithmic in principle.

ST05: A Display Driven Routine is called. The input power information is regulated by the combination of the following factors; constant electrical current, duty driven time '$T_x$', and LED (i)i=1 to 3 which represent the LED to be lit up.

ST06: Wait for '$T_{wait}$' is necessary for safe photometry. Then, it will go back to the photometric routine—call mode.

Now the explanation about each sub-routine will be made.

ST11: Photometric routine.

ST12: In order to measure the flicker of an artificial light source, some samplings of photometry are needed. The number of flickers should be counted, and the value '$T_{LOOP}$', which is the photometric sensitivity will be taken from that number. The three sensors are monitored to determine the photometric average as described in the following formula;

$$T_{LOOP} = \frac{T_{measure}}{3 \times N}$$

When the number of sensors become 'm' pieces, the factor 3 of the above formula will be changed into 'm' and 'for i=1 to 3' in step 17 will be 'for i=1 to m'.

ST13 to 15: To get the average value of 'N' times of three sensors, the value of SUM (i) 1 to 3 should be temporary cleared.

ST18: To do the photometry of the 'i' th number of sensor $IN_i$ should be selected by transmitting the output power to a port of multiplexer.

ST19: DO a A/D conversion through the A/D converter and make that value "D".

ST20: Repeat the calculation of SUM (i)=SUM (i)+D.

ST21: Wait for '$T_{LOOP}$' which have been obtained from ST 12.

ST16 to ST23: Repeat the processes of ST18 through ST21 'N' times and do the sampling of TOTAL 3×'N' times. It means that 'AD' value of the corresponding sensor has been already added 'N' times to SUM (i) i=1 to 3.

ST24 to ST26:

$$AD(i) = \frac{SUM(i)}{N} \quad i = 1 \text{ to } 3$$

tells that the average photometry value 'N' times, of each corresponding sensor, will be inputted to each 'AD (i)'. Namely, it means that the brightness of the object on the focusing frame 5, when the LED is off, which has been inputted into AD (i), was correspondingly determined by each sensor.

ST27: Return to Main Routine.

ST31: Light-Define Routine

ST32: Temporarily make the variables SUM=bit=0.

ST33 to ST37: LED which is expected to light as described in "LED (i)=1" and others which should be off as described in "LED (i)=0". The number of LEDs which should be lighted with the variables 'bit' is counted, and the photometric value AD (i) of the sensors which corresponds to each LED is calculated to obtain 'SUM'.

ST38: When the number of LEDs to be lighted is 0, bit=0, and therefore the process to ST40 in order to avoid the error of the mathematical division by zero.

ST39: Calculate the average photometric value of the sensors, which corresponds to the flashing LEDs by $$x = \frac{SUM}{bit}$$

ST40: Return to Main Routine
ST51: Calculation Routine
ST52: Retrieve the adjustment data of $\gamma_1$–$\gamma_3$, and $L_1$–$L_3$ which have been inputted in EEPROM.
ST53 to ST60: Formulate 'j' and '$T_x$' as follows to clarify the relation of 'x' and $L_1$, $L_2$, $L_3$ in FIG. 5.

| Extent | Constant Electrical Current source | Duty Driven time |
| --- | --- | --- |
| $x \leq L_3$ | current = 3 | $T_x = T_a \times \frac{1}{2\gamma 3(L3-x)}$ |
| $L_3 < x \leq L_2$ | current = 2 | $T_x = T_a \times \frac{1}{2\gamma 2(L2-x)}$ |
| $L_2 < x \leq L_1$ | current = 1 | $T_x = T_a \times \frac{1}{2\gamma 1(L1-x)}$ |
| $x \geq L_1$ | current = 1 | $T_x = T_a$ |

The above calculation has been obtained from ST53 to ST60. Current=1 to 3 corresponds to the constant electrical currents of lines 1 to 3 in FIG. 5 respectively.

ST61: Return to Main Routine.
ST71: LED Driven Routine.
ST72 to ST76: Set the output of $B_{ij}$ of register REG while watching the (i) value of the expected lighting LEDs. For example, when LED 1 is driven by the constant electrical current source 2 (line 2), the constant electrical current $I_{12}$ will be turned on by setting $B_{12}$ high, and LED 1 will be driven by the electrical current corresponding to line 2.

ST77: Wait for lighting time $T_x$.
ST78 to ST82: Turn off all LEDs by making B=0, including those lighted during ST72 through ST76.
ST83: Wait for '$T_a$-$T_x$' time.
ST84: Return to Main Routine. Ideally, delay time due to execution of program should be taken into consideration when setting the wait time. However, in order to be practical, we have excluded the factor for simplicity sake, and because the value of it is small enough to discard.

ST90: Auto-focus Routine. This auto-focus routine is the program which has been drawn from the Main routine mode. It has three measuring areas which have been set up almost in the same way as the superimposed indicators of d1–d3 shown in FIG. 1. This will be achieved by setting up the position of sensor 10 for focus and for photometry.

ST91: Select the mode for auto-focus. Auto-focus will be possible by three area measurements. There is a manual-mode in which the photographer can select a certain measuring area, an auto-focus mode where 3 sets of sensors measure an adequate amount of area automatically.

ST92: It judges, when the auto-focus mode is selected, where the main subject is located within the three measuring areas. For example, it judges that the nearest object is the main subject and achieves automatic focusing by the output of the particular sensor for that area.

ST93: When the manual mode is selected, activate the superimposed indicators (one of d1, d2 or d3) which corresponds to an area selected among the three measuring areas. And, give the command when the auto-mode is selected, to flash the superimposition of d1 to d3 which corresponds to the measuring areas on the focus lens. In this case, the number of indicated superimposed indicators d1 to d3 is not necessarily one.

ST94: Return. In the present embodiment, the photometric fields of the SPC photometry sensor corresponding to the superimposed indicators are slightly larger than the indicators, but one indicator corresponds to one sensor. However, sometimes one indicator area may stretch over the photometric fields of several SPC photometry sensors. In this case, the average of the outputs of the involved sensors is output and used to control the brightness to obtain an optimum display.

The operation is based on the average value of the logarithmical compressed photometric values in the case of this embodiment, but by giving priority to bright sensor outputs and then basing the operation on the average output, an even more appropriate brightness of the superimposed indicators is maintainable.

In the embodiment mentioned above, it was decided to calculate the ON duration of the brightness modulation of the superimposed indicators as $T_x = T_a \times 2^{-\gamma(L-X)}$. However, in some cases the program area necessary to operate $2^{\gamma(L-X)}$ becomes too large. In these cases, in advance the previously mentioned $T_x$ method should be followed to store in memory several (x, $T_x$) computation tables. By referring to these tables it is possible to calculate according to the $T_x$ method in most cases.

By employing the above described method to drive the display, it is possible to offer a display brightness that is visually more appropriate also in the case of the kind of display indications that appear in normal viewfinders.

As described above, the superimposed indicators are displayed at several locations, when selecting one indicator among several to be displayed, this indicator will have a brightness corresponding to the brightness of the corresponding field of the object. If more than 2 indicators are selected to be displayed, the brightness of the display will be determined by the average output determined by the brightness intensity of the fields corresponding to the indicators. In this way it is possible to obtain an optimum display of the indications superimposed on the object inside the frame reticle of the viewfinder. The superimposed indicators will neither be too light nor too dark, but will keep track with the brightness of the object. At the same time it is possible to obtain a camera display device that is also capable of maintaining balance of brightness between several superimpose indicators.

In the embodiment, by application of both a phased constant drive and brightness modulation it is possible to display superimposed indicators with a wide dynamic range capable of keeping track of an object possessing a brightness pattern also characterized by a wide dynamic range.

By activating the light state, wait state and display state in a cyclic order it is possible to control the brightness of the display so the brightness in near real-time follows the brightness of the object. In addition, it is possible to prevent bad influences upon the photometry. By parallel application of the phased constant-current drive and brightness modulation, the amount of stray light is kept to a minimum especially in the case of low brightness conditions. Accordingly, the slowness of the response speed of the photometer sensor in the case of low brightness conditions is effective in preventing erroneous light measuring.

Furthermore, since the duration of both the display state and wait state in the embodiment is kept below 10 ms, a display with a frequency above 50 Hz that is not seen to flicker by the human eye becomes obtainable even when the photometric period of about 10 ms, that is necessary to prevent flicker, is added in the embodiment.

Since the brightness of the superimposed indicators is maintained by a simple brightness modulation method, it is possible to offer a visually comfortable display that is always easily discernible. Since individual eyesights vary greatly, the control of the display is systematized, opening up for simplified process adjustment. The improved capacity of the memory, where the data concerning adjustments is stored, also contributes to minimizing the adjustment variables.

What is claimed is:

1. A superimposing display device that superimposes indicators upon an image seen in a viewfinder, comprising:
   display means for displaying at least one indicator of a multiple of indicators in a corresponding field of a plurality of fields, with said display means being superimposed upon the image observed in the viewfinder;
   detection means for detecting brightness intensity information of each of the fields; and
   control means for individually controlling the brightness of the at least one indicator in the corresponding field in accordance with brightness intensity information of the corresponding field obtained by said detection means.

2. A device according to claim 1, wherein the indicators appear as light radiating elements within the viewfinder.

3. A device according to claim 2, wherein a display time of said display means, and a detection time of said detection means are shifted from each other.

4. A device according to claim 1, wherein when one selected indicator is chosen to be displayed, said control means controls the brightness of the selected indicator based upon the brightness intensity information of the field corresponding to the selected indicator and when two or more indicators are displayed simultaneously, the control of the brightness of the display of the indicators is based upon an average brightness intensity of all the corresponding fields.

5. A device according to claim 1, wherein said control means utilizes both phased constant-current drive and brightness modulation to control the brightness of said indicators.

6. A device according to claim 2, wherein the control of the brightness of said light radiating elements by said control means is obtained both by phased constant-current drive and duty restricted brightness modulation.

7. A device according to claim 3, wherein a wait state is provided between a display state caused by said display means and a detection time caused by said detection means, and said display state and said wait state and said light measuring time are repeated in a cyclic order.

8. A device according to claim 7, wherein a duration of both said display state and said wait state is below 10 ms.

9. A camera including a display device that superimposes indicators upon an image of a viewfinder, comprising:
   an optical system for introducing the image of an object to the viewfinder;
   display means for displaying at least one indicator of a multiple of indicators in a corresponding field of a plurality of fields, with said display means being superimposed upon the image observed in the viewfinder;
   first detection means for detecting brightness intensity information of each of the fields; and
   control means for individually controlling the brightness of the at least one indicator in the corresponding field in accordance with brightness intensity information of the corresponding field obtained by said detection means.

10. A camera according to claim 9, wherein said indicators appear as light radiating elements within the viewfinder.

11. A camera according to claim 10, wherein a display time of said display means, and a detection time of said first detection means are shifted from each other.

12. A camera according to claim 9, wherein when one selected indicator is chosen to be displayed, said control means controls the brightness of the selected indicator based upon the brightness intensity information of the field corresponding to the selected indicator, and when two or more indicators are displayed simultaneously, the control of the brightness of the display of the indicators is based upon the average brightness intensity of all the corresponding fields.

13. A camera according to claim 9, wherein said control means utilizes both phased constant-current drive and brightness modulation to control the brightness of said indicators.

14. A camera according to claim 10, wherein the control of the brightness of said light radiating elements by said control means is obtained both by phased constant-current drive and duty restricted brightness modulation.

15. A camera according to claim 11, wherein a wait state is provided between a display state caused by said display means and a detection time caused by said first detection means, and said display state and said wait state and said light measuring time are repeated in a cyclic order.

16. A camera according to claim 15, wherein a duration of both said display state and said wait state is below 10 ms.

17. A camera according to claim 9, further comprising:

second detection means for detecting a focusing conditions of the fields substantially corresponding to the multiple indicators.

18. A camera according to claim 17, wherein said display means selectively displays the indicators based upon first information gained by said second detection means.

19. A camera according to claim 18, wherein said second detection means outputs second information that is used in order to display the indicators in an in-focus state.

20. A camera according to claim 9, further comprising:
a focusing means for allowing selective detection of focusing conditions of fields substantially corresponding to the multiple indicators.

21. A camera according to claim 20, wherein said display means selectively displays the indicator based upon third information gained by first detection means.

22. A superimposing display device that superimposes indicators upon an image seen in a viewfinder; comprising:
display means with a display element to be displayed in a field, said display means being superimposed upon the image observed in said viewfinder;
detection means for detecting a brightness intensity information of the image; and
control means for, based upon the brightness intensity information obtained by said detection means, controlling the brightness of said display element, a duration of lighted time, Tx of said display element being determined by a formula, $$Tx = Ta \times 2^{-\gamma(L-x)}$$

where
Ta: Maximum light time,
x: Brightness of image,
L: Brightness of image when light time Tx is maximum light time, and
γ: Linearity constant.

23. A device according to claim 22, wherein the display element is a light radiating element comprised of an LED.

24. A device according to claim 22, wherein said display means is made up of several display elements to display several indicators in several fields, with detection means detecting the brightness in all the fields.

25. A camera including a display device that superimposes indicators upon an image seen in a viewfinder, comprising:
an optical system for introducing the image of an object in the viewfinder;
display means with a display element to be displayed in a field, said display means being superimposed upon the image observed in the viewfinder;
detection means for detecting brightness intensity information of the image; and
control means for, based upon the brightness intensity information obtained by said detection means, controlling brightness of said display element, a duration of lighted time, Tx of said display element being determined by formula, $$Tx = Ta \times 2^{-\gamma(L-x)}$$

where
Ta: Maximum light time,
x: Brightness of image,
L: Brightness of image when light time Tx is maximum light time, and
γ: Linearity constant.

26. A camera according to claim 25, wherein the display element is a light radiating element comprised of an LED.

27. A camera according to claim 25, wherein said display means is made up of several display elements to display several indicators in several fields, with said detection means detecting the brightness in all the fields.

* * * * *

UNITED STATES PATENT AND TRADEMARK OFFICE
CERTIFICATE OF CORRECTION

PATENT NO. : 5,404,193          Page 1 of 2
DATED      : April 4, 1995
INVENTOR(S): Harada It is certified that error appears in the above-indentified patent and that said Letters Patent is hereby corrected as shown below: Title page, item

[30] FOREIGN APPLICATION PRIORITY DATA:

"Aug. 4, 1990 [JP] Japan 1-203061" should read
--Aug. 4, 1989 [JP] Japan 1-203061--.

[57] ABSTRACT:

Line 2, "superimposed" should read --superimposing--.

COLUMN 4:

Line 51, "expotentially" should read --exponentially--.
Line 58, "$T_a$(drive-time lengths)." should read
--$T_a$ at x = 20.--.

COLUMN 6:

Line 37, "3" should read --"3"--.

COLUMN 9:

Line 62, "indicator" should read --indicator,--.

COLUMN 10:

Line 62, "said" should read --a--.

UNITED STATES PATENT AND TRADEMARK OFFICE
CERTIFICATE OF CORRECTION

PATENT NO. : 5,404,193

DATED : April 4, 1995

INVENTOR(S) : Harada

It is certified that error appears in the above-indentified patent and that said Letters Patent is hereby corrected as shown below:

COLUMN 11:

Line 1, "a" should be deleted.
Line 18, "indicator" should read --indicators--.
Line 21, "viewfinder;" should read --viewfinder,--.

COLUMN 12:

Line 7, "with" should read --with said--.
Line 23, "by" should read --by a--.

Signed and Sealed this

Twenty-sixth Day of September, 1995

Attest:

BRUCE LEHMAN

Attesting Officer   Commissioner of Patents and Trademarks